106. COMPOSITIONS, COATING OR PLASTIC.

93

W. WAWRZYNIAK.
BUILDING MATERIAL.
APPLICATION FILED SEPT. 20, 1918.

1,407,608.   Patented Feb. 21, 1922.

<u>Cement</u>
1 volume

<u>Wood Fiber</u>
4 volumes

<u>Calcined Gypsum (CaSO₄)</u>
<u>& Vegetable Fiber</u>
2 volumes

<u>Weed Stalks</u>

INVENTOR
WALENTY WAWRZYNIAK.
By Adam E. Fisher
ATTORNEY

UNITED STATES PATENT OFFICE.

WALENTY WAWRZYNIAK, OF ST. LOUIS, MISSOURI.

BUILDING MATERIAL.

1,407,608. Specification of Letters Patent. Patented Feb. 21, 1922.

Application filed September 20, 1918. Serial No. 255,005.

*To all whom it may concern:*

Be it known that I, WALENTY WAWRZYNIAK, a citizen of the United States, residing in the city of St. Louis and State of Missouri, have invented new and useful Improvements in Building Materials, of which the following is a specification, reference being had to the accompanying drawings.

This invention relates to building materials and has for its object the production of a conglomerate plastic building material composed of several ingredients, and which when properly mixed and combined, affords an economical and efficient substitute for other forms of building material.

A further object is to provide a plastic building material which may be shaped to any desired form, and which will harden after being so shaped.

A further object is to provide such building material of a construction which will admit of the driving of nails, or the setting of screws into same without cracking the material, and so that said nails or screws will be firmly held in place.

In the drawings, Fig. 1 is a sectional perspective of a conglomerate board, showing the parallel reinforcing weed stalks;

Figure 1:
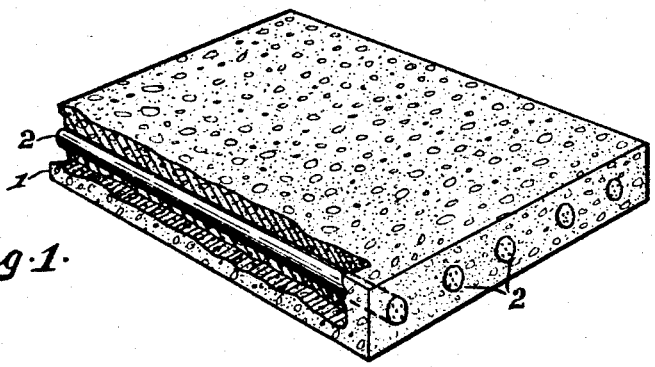

In carrying out my invention, I utilize the ingredients and in the proportions as follows:

Cement—one part (bulk measure.)
Wood fiber—four parts (bulk measure.)
"Acme" (fibred)—two parts (bulk measure.)
Weed stalks as a reinforcement.

The substance above referred to as "Acme" is an admixture of calcium sulphate, more commonly known as gypsum, whose chemical formula is $CaSO_4$, and a fibrous substance, the latter constituting a strengthening and binding medium for the mass. Gypsum is found in its crystalline forms as selenite, anhydrite and alabastor. After the gypsum is calcined and reduced to a finely divided mass it is intermixed with a vegetable fiber which gives additional strength to the plastic mass after setting. The mixture of calcined gypsum and the fiber is called "Acme" and is a product manufactured by the American Cement Plaster Co. of Lawrence, Kansas.

Figure 2:
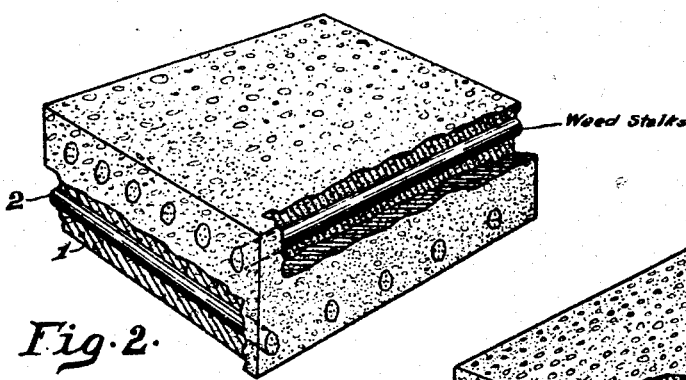
Fig. 2, is a similar view of a conglomerate plank, showing double rows of weed stalks transversely disposed.
Figure 3:
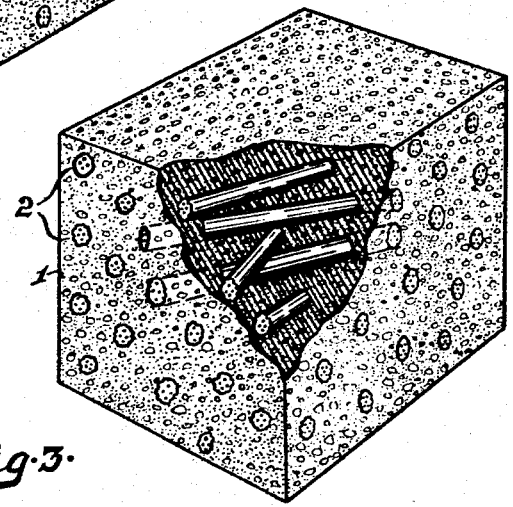
Fig. 3 is a similar view of a conglomerate block, showing a massed form of weed stalk reinforcement.

These ingredients are mixed together in their dry form. Water or other liquid is then added to reduce same to the desired consistency; that is to say, the consistency of a stiff mortar. This mixture is represented by 1 in the drawings. The reinforcing weed stalks, represented by 2 in the drawings, are then spread through the mixture spaced about one inch apart, or as may be desired. These weed stalks may be arranged parallel or crosswise as may be desired for any particular form of material.

Where this composition is to be used as a substitute for boards or planks, the plastic material 1 is spread out in a thin sheet, and the reinforcing weed stalks 2 are then laid down upon the plastic material in parallel lines, after which another layer of the plastic material is superimposed over the first layer to the required thickness, thereby enclosing and encasing the weed stalks. When the material hardens, the result will be a composite structure of the desired thickness, as shown in Fig. 1, and which will serve as a very efficient building material, or as a substitute for boards. A plank or other thicker structure is best formed by superimposed layers of the plastic material 1 over transversely disposed layers of weed stalks 2, as shown in Fig. 2. A block or other heavy structure may be best formed by promiscuously massing and intermingling the weed stalks 2 through the plastic material 1, as in Fig. 3. Likewise, the material may be formed to any other suitable size for different purposes required, and the reinforcing weed stalks may be interspersed accordingly.

While I have herein described a certain specific manner and method of assembling the elements of my invention, it is understood that I may vary from the same in minor details, not departing from the spirit of my invention, so as to best serve the purposes intended, as defined in the appended claims.

What I claim to be new and patentable is:

1. A conglomerate building material, comprising cement, wood fiber, fibered "Acme," weed stalks and a liquid mixed together to the desired consistency.

2. A conglomerate building material, comprising one part cement, four parts wood fiber, two parts fibered "Acme," liquid to reduce to a mortar and a plurality of weed stalks as a reinforcement.

3. A conglomerate building material, comprising cement, wood fiber, fibered "Acme," water and weed stalks, all intermingled to form a plastic mass.

WALENTY WAWRZYNIAK.

Witnesses:
A. K. Doble,
A. M. Dowd.